(12) United States Patent
Chambers, Sr.

(10) Patent No.: US 6,843,017 B1
(45) Date of Patent: Jan. 18, 2005

(54) FISHING LURE

(75) Inventor: William E. Chambers, Sr., Watkinsville, GA (US)

(73) Assignee: Zoom Bait Company, Inc., Bogart, GA (US)

( * ) Notice: Subject to any disclaimer, the term of this patent is extended or adjusted under 35 U.S.C. 154(b) by 0 days.

(21) Appl. No.: 10/427,659

(22) Filed: May 1, 2003

(51) Int. Cl.[7] .............................................. A01K 85/00
(52) U.S. Cl. ........................ 43/42.28; 43/42.24; 43/42.3
(58) Field of Search ............................. 43/42.24, 42.26, 43/42.28, 42.3, 42.03, 42.15

(56) References Cited

U.S. PATENT DOCUMENTS

| | | | | |
|---|---|---|---|---|
| 941,911 A | * | 11/1909 | Burthe | 43/42.26 |
| 1,184,588 A | * | 5/1916 | Sprague | 43/42.3 |
| 1,813,722 A | * | 7/1931 | Wright et al. | 43/42.26 |
| 2,083,513 A | * | 6/1937 | Burge | 43/42.3 |
| 2,594,673 A | * | 4/1952 | Nichols | 43/42.33 |
| D167,636 S | | 9/1952 | Kautzky | |
| 2,847,791 A | * | 8/1958 | Simmons | 43/42.26 |
| 3,218,750 A | * | 11/1965 | Lewin | 43/42.28 |
| 3,861,073 A | * | 1/1975 | Thomassin | 43/42.24 |
| 3,861,075 A | * | 1/1975 | Ingram | 43/42.26 |
| 3,879,882 A | * | 4/1975 | Rask | 43/42.28 |
| D237,274 S | | 10/1975 | Roberts et al. | |
| 3,959,912 A | * | 6/1976 | Lee | 43/42.28 |
| 3,983,656 A | | 10/1976 | Bain | |
| D242,347 S | * | 11/1976 | Carver | D22/127 |
| 4,044,492 A | * | 8/1977 | Ingram | 43/42.28 |
| 4,050,181 A | * | 9/1977 | Young et al. | 43/42.06 |
| 4,074,454 A | * | 2/1978 | Cordell, Jr. | 43/42.28 |
| 4,138,792 A | * | 2/1979 | Hill | 43/42.24 |
| 4,177,597 A | * | 12/1979 | Thomassin | 43/42.3 |
| 4,316,343 A | * | 2/1982 | Creme | 43/42.24 |
| 4,317,305 A | * | 3/1982 | Firmin | 43/42.24 |
| 4,619,069 A | * | 10/1986 | Strickland | 43/42.26 |
| 4,709,501 A | * | 12/1987 | Garst | 43/42.24 |
| 4,744,168 A | * | 5/1988 | McClellan | 43/42.24 |
| 4,858,367 A | * | 8/1989 | Rabideau | 43/42.28 |
| 4,885,867 A | * | 12/1989 | Leal | 43/42.26 |
| 4,887,377 A | * | 12/1989 | Morris | 43/42.24 |
| 4,926,578 A | * | 5/1990 | Morse et al. | 43/42.24 |
| 4,953,319 A | * | 9/1990 | Kasper et al. | 43/42.24 |
| 5,009,024 A | * | 4/1991 | Parman | 43/42.3 |
| 5,136,801 A | * | 8/1992 | Pond | 43/42.24 |
| 5,142,811 A | * | 9/1992 | Freeman | 43/42.24 |
| D336,324 S | * | 6/1993 | Wood | D22/127 |

(List continued on next page.)

FOREIGN PATENT DOCUMENTS

| | | | | |
|---|---|---|---|---|
| CA | 2360518 A1 | * | 4/2003 | |
| FR | 1504690 B1 | * | 10/1967 | 43/42.28 |
| FR | 2145083 B1 | * | 2/1973 | |
| JP | 10-117635 B1 | * | 5/1998 | |
| JP | 10-225247 B1 | * | 8/1998 | |
| JP | 11-113448 B1 | * | 4/1999 | |
| JP | 11-243813 B1 | * | 9/1999 | |
| JP | 2000-83512 B1 | * | 3/2000 | |
| JP | 2002-95387 B1 | * | 4/2002 | |

*Primary Examiner*—Darren W. Ark
(74) *Attorney, Agent, or Firm*—Boyle, Fredrickson, Newholm, Stein & Gratz, S.C.

(57) ABSTRACT

A fishing lure generally includes a body and a body extension member that extends rearwardly from the body. The body may be in the form of a grub or worm, and the body extension member may be in the form of a tail that extends from the rearward end of the body. Alternatively, the body may be in the form of a crayfish and a pair of body extension members, in the form of arms, may extend from the rearward end of the body. The body extension member includes first, second, and third portions. The first portion extends away from the body, and the second portion connects to the first portion. The third portion connects to the second portion and extends generally toward the body. The third portion includes a forwardly facing inner edge that may be linear, and the first and third portions preferably cooperate to form an acute angle.

28 Claims, 3 Drawing Sheets

U.S. PATENT DOCUMENTS

| | | | |
|---|---|---|---|
| 5,428,918 A | * 7/1995 | Garrison | 43/42.28 |
| 5,465,523 A | * 11/1995 | Garst | 43/42.24 |
| 5,494,432 A | * 2/1996 | Coggins et al. | 43/42.24 |
| 5,640,798 A | * 6/1997 | Garst | 43/42.24 |
| 5,894,692 A | * 4/1999 | Firmin | 43/42.24 |
| D414,838 S | 10/1999 | Chambers, Sr. | |
| 5,996,271 A | * 12/1999 | Packer | 43/42.24 |
| 6,170,190 B1 | * 1/2001 | Wilson | 43/42.28 |
| 6,237,275 B1 | * 5/2001 | Chambers, Sr. | 43/42.3 |
| 6,266,915 B1 | * 7/2001 | Stump | 43/42.24 |
| D452,548 S | 12/2001 | Bambacigno | |
| 6,363,651 B1 | * 4/2002 | Garst | 43/42.24 |
| D458,335 S | 6/2002 | Bambacigno | |
| D480,780 S | * 10/2003 | Chambers, Sr. | D22/127 |
| 6,634,135 B1 | * 10/2003 | Rydell | 43/42.24 |
| 2002/0170225 A1 | * 11/2002 | Gibbs et al. | 43/42.28 |
| 2002/0189150 A1 | * 12/2002 | Thorne | 43/42.15 |
| 2002/0194770 A1 | * 12/2002 | King | 43/42.24 |
| 2003/0196368 A1 | * 10/2003 | Ito | 43/42.24 |

* cited by examiner

FISHING LURE

BACKGROUND AND SUMMARY OF THE INVENTION

The invention relates to a fishing lure, and more particularly to an artificial fishing lure which acts to simulate live bait movement.

Artificial fishing lures are typically designed to resemble or otherwise imitate live bait. Soft plastic artificial fishing lures are commonly configured to resemble worms, bugs or small fish. A drawback to many types of soft plastic fishing lures is that the lure tends to exhibit unnatural movements, or movements that are otherwise not attractive to fish, when traveling through the water.

Many attempts have been made to provide artificial fishing lures that more closely replicate live bait movement, or that otherwise exhibit action that is attractive to fish. A common attempt includes the provision of a tail, which causes the lure to move when the lure is pulled through the water by a fishing line. In a representative prior art construction, the tail extends out from a body of the fishing lure at a rear end of the lure, opposite the fishing line. The conventional tail has a flat, curved end that defines a J-shape. The tail flutters slightly and imparts slight movement to the body when the lure is pulled through the water. However, these types of tails are relatively limp and generally do not provide the desired strong movements that are known to attract fish.

Therefore, it is a primary object and feature of the present invention to provide a fishing lure that simulates live bait movement. It is a further object and feature of the present invention to provide a fishing lure that provides vigorous action that is attractive to fish. It is a further object and feature of the present invention to provide a fishing lure having a design that resembles the appearance of live bait while providing unique movement and action as the fishing lure is pulled through the water.

In accordance with the present invention, a fishing lure generally includes a body and a body extension member, which may be in the form of a tail. The body extension member includes first, second, and third portions. The first portion extends away from the body, and the second portion is connected to an outer end defined by the first portion. The third portion is connected to the second portion, and extends generally toward the body. The third portion includes a generally linear inner edge, and the first and third portions are preferably configured to form an acute angle. The linear edge of the body extension member catches the water as the lure is pulled through the water, and the configuration of the body extension member provides vigorous movement of the body extension member as well as the body, that is attractive to fish.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
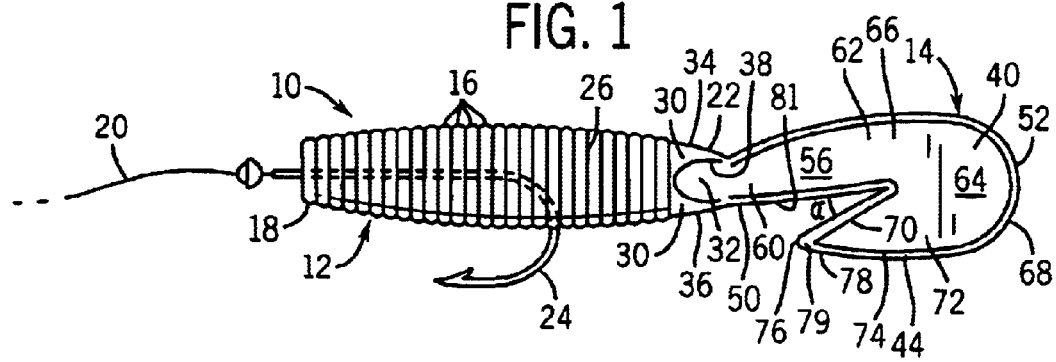
FIG. 1 is a side elevation view of an artificial fishing lure incorporating a body extension member, in the form of a tail, in accordance with the present invention, showing the artificial lure at rest.

A first preferred embodiment of a fishing lure 10 includes a body 12 and a body extension member in the form of a tail 14, as is shown in FIG. 1. For the sake of reference only, the fishing lure 10 and its various parts will be described as having a front end and a rear end. The front end is the end of the fishing lure that is typically attached to a fishing line. In the illustrated embodiment, the body 12 has a shape generally resembling that of a grub, and includes ribs 16 that extend around the body 12 along its length. The body 12 defines a front end 18, at which a fishing line 20 can be connected via a hook 24, in a manner as is known, and a rear end 22 from which the tail 14 extends. The body 12 is dimensioned and configured such that a fishing hook 24 can be inserted into the front end 14 of the body 12 and out of a side of the body 12. In the illustrated embodiment, the body 12 has a generally cylindrical shape, and the front and rear ends 18 and 22 are tapered. The body also defines a front side 26 and an oppositely facing rear side (not shown).

On both its front side 26 and rear side, the rear end 22 of the body 12 includes a first portion 30 having a first thickness and a second portion 32 having a second thickness that is less than the first thickness. The first portion 30 is disposed outwardly from the second portion 32. The first portion 30 includes first and second outer surfaces 34 and 36, each of which tapers inwardly, and an inner edge 38, which is C-shaped. With this construction, second portion 32 generally defines a dimple that is located rearwardly of edge 38 defined by first portion 30.

The tail 14 includes a front side 40 and a rear side 42, which define outer edges 44 and 46, respectively, that are tapered such that one edge meets the other at an outer rim 48 of the tail 14.

The tail 14 also includes a front end 50, at which the tail 14 connects to the body 12, and a rear end 52, which is free and which curves outwardly. The tail 14 also includes a first portion 56, a second portion 64, and a third portion 70. The first portion 56 extends away from the body 12 and includes a forward end 60 and a rearward end 62. The second portion 64 includes a forward end 66 and a rearward end 68. A section of the forward end 66 connects to the rearward end 62 of the first portion 56. The rearward end 68 of the second portion 64 defines the free end of tail 14. The third portion 70 includes a rearward end 72 and a forward end 74. The rearward end 72 of the third portion 70 connects to a section of the rearward end 68 of the second portion 64. The forward end 74 of the third portion 70 extends generally forwardly toward the body 12. The forward end 74 of the third portion 70 includes a substantially linear inner edge 76 and a curved outer edge 78 that cooperate to form a point 79 therebetween.

In a preferred version of the fishing lure 10, the first portion 56 and the third portion 70 are configured to form an acute angle α between linear edge 76 of third portion 70 and the facing edge of first portion 56, shown at 81. Preferably, the acute angle α is an angle of between about 15 degrees and about 35 degrees. More preferably, the acute angle α is an angle of about 25 degrees.

While the specific disclosure of fishing lure 10 contained herein shows facing edges 76 and 81 as being linear, it is understood that edges 76 and 81 may have a non-linear configuration. For example, and without limitation, edges 76 and 81 may have a linear, concave or convex configuration or any combination thereof, so long as edges 76 and 81 are, formed so as to define a definite point of intersection therebetween.

As shown in the drawings, first portion 56 and the area of second portion 64 in alignment with first portion 56 extend along an axis in a rearward direction from the rear end of body 12. Third portion 70 and the area of second portion 64 in alignment with third portion 70 are laterally offset from the axis of first portion 56, which provides the twisting motion of tail 14 as fishing lure 10 is pulled through the water.

Preferably, the fishing lure 10 is made from a resilient soft plastic material in a manner as is known in the art, or from any other material that is attractive to fish and provides the fishing lure 10 with the ability to flex and twist.

In use, a hook 24 is inserted through the front end 18 of the body 12 and out of a side of the body 12. The fishing lure 10 is cast into a body of water and is reeled back toward the user, in a known manner. As fishing lure 10 is reeled in, the structure of the fishing lure 10 imparts movement to fishing lure 10 that has been found to be attractive to fish.

Figure 4:
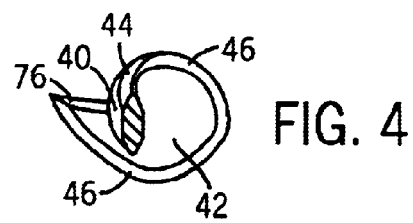
FIG. 4 is a sectional view through line 4—4 of FIG. 3.
Figure 7:
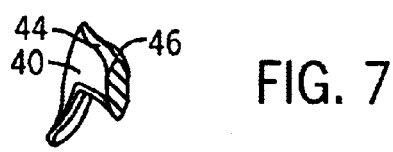
FIG. 7 is a sectional view through line 7—7 of FIG. 6.
Figure 10:
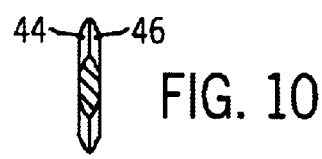
FIG. 10 is a sectional view through line 10—10 of FIG. 9.
Figure 13:
FIG. 13 is a sectional view through line 13—13 of FIG. 12.
Figure 16:
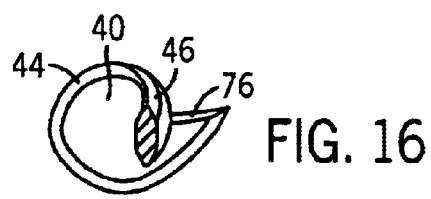
FIG. 16 is a sectional view through line 16—16 of FIG. 15.
Figure 2:
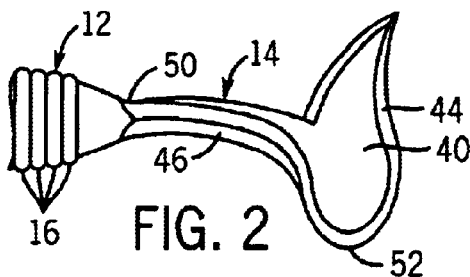
FIG. 2 is a partial top plan view of the artificial fishing lure or FIG. 1, showing the lure in a first position during movement of the lure through the water.
Figure 3:
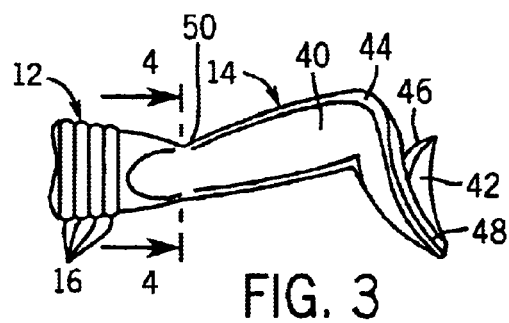
FIG. 3 is a partial side elevation view of the artificial fishing lure in the position of FIG. 2.
Figure 5:
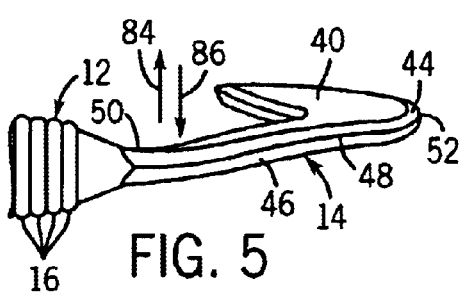
FIG. 5 is a partial top plan view of the artificial fishing lure of FIG. 1, showing the lure in a second position during movement of the lure through the water.
Figure 6:
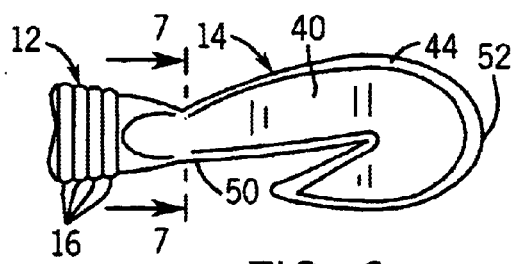
FIG. 6 is a partial side elevation view of the artificial fishing lure in the position of FIG. 5.
Figure 8:
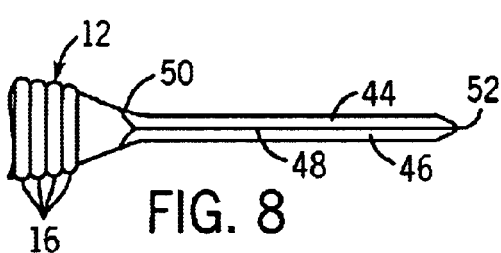
FIG. 8 is a partial top plan view of the artificial fishing lure of FIG. 1, showing the lure in a third position during movement through the water.
Figure 9:
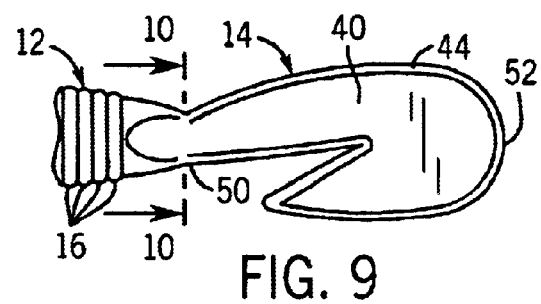
FIG. 9 is a partial side elevation view of the artificial lure in the position of FIG. 8.
Figure 11:
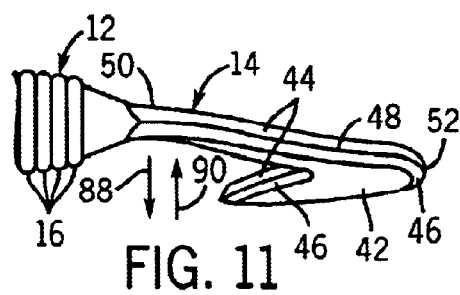
FIG. 11 is a partial top plan view of the artificial fishing lure of FIG. 1, showing the lure in a fourth position during movement through the water.
Figure 12:
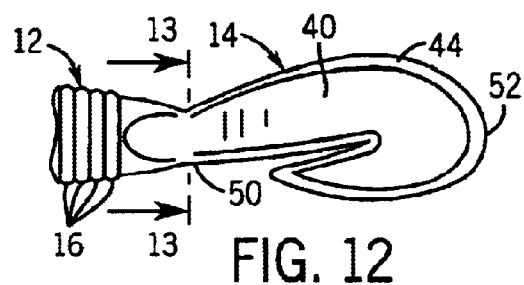
FIG. 12 is a partial side elevation view of the artificial lure in the position of FIG. 11.
Figure 14:
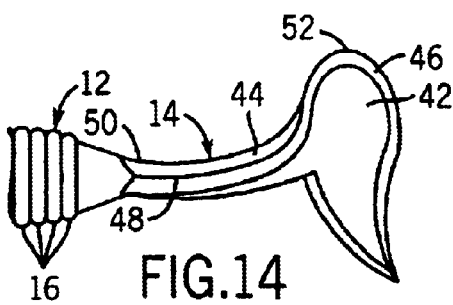
FIG. 14 is a partial top plan view of the artificial fishing lure of FIG. 1, showing the lure in a fifth position during movement through the water.
Figure 15:
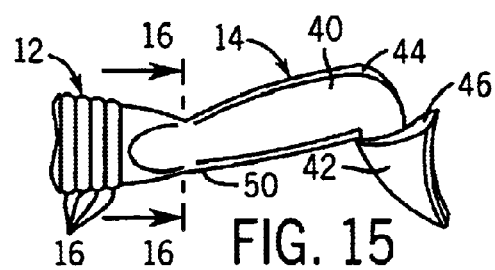
FIG. 15 is a partial side elevation view of the artificial lure in the position of FIG. 14.

FIGS. 2–16 show the action of fishing lure 10 during movement through the water, which occurs as lure 10 is being reeled in. Initially, when fishing lure 10 is first cast out, tail 14 assumes an at-rest position in which first portion 56, second portion 64 and third portion 70 are generally coplanar as shown in FIGS. 8–10. As fishing lure 10 is moved in an axial direction through the water, the inner edge 76 of third portion 70 catches the water and initiates a twisting motion of tail 14. Such movement of tail 14 first involves outward movement of third portion 70 in one direction, which representatively may be in the direction of arrow 84 (FIG. 5), although initial outward movement of third portion 70 may also be in the opposition direction. As tail 14 is moved outwardly in this manner, the entire area of tail 14 rearwardly of first portion 56 is shifted laterally or transversely in the direction of arrow 84 as shown in FIGS. 5–7, and the exposure of inner edge 76 to the water then imparts a twisting motion which causes tail 14 to twist and results in tail 14 moving from the position as shown in FIGS. 2–4 toward the position as shown in FIGS. 2–4. Such twisting of tail 14 results from the water impinging upon inner edge 76 and the surface of third portion 70, which is offset from the longitudinal center of tail 14. Ultimately, such movement of tail 14 results in tail 14 reaching the position of FIG. 2-4, wherein third portion 70 is moved outwardly in one direction relative to the longitudinal center of tail 14 and second portion 64 is moved outwardly in the opposite direction. When tail 14 is in this position, the surface area of second portion 64 that is exposed to the water exceeds that of third portion 70, which causes second portion 64 and third portion 70 to return toward the longitudinal center of tail 14, in the direction of arrow 86 (FIG. 5). Tail 14 is then moved to the position as shown in FIGS. 8–10, in which the various portions of tail 14 are in alignment and extend in a coplanar manner rearwardly from body 12. Continued movement of fishing lure 19 results in tail 14 moving in the opposite direction as shown by arrow 88 (FIG. 11), in which the entire area of tail 14 rearwardly of first portion 56 is shifted laterally or transversely in the direction of arrow 88 (opposite the direction of arrow 84 in FIG. 5), and the exposure of inner edge 76 to the water then imparts a twisting motion which causes tail 14 to twist in the opposite direction and results in tail 14 moving from the position as shown in FIGS. 11–13 toward the position as shown in FIGS. 14–16. As before, such twisting of tail 14 results from the water impinging upon inner edge 76 and the opposite surface of third portion 70, which is offset from the longitudinal center of tail 14. Ultimately, such movement of tail 14 results in tail 14 reaching the position of FIGS. 11–14, wherein third portion 70 is moved outwardly in one direction relative to the longitudinal center of tail 14 and second portion 64 is moved outwardly in the opposite direction. Again, when tail 14 is in this position, the surface area of second portion 64 that is exposed to the water exceeds that of third portion 70, which causes second portion 64 and third portion 70 to return toward the longitudinal center of tail 14, in the direction of arrow 90 (FIG. 11). Tail 14 is then moved to the position as shown in FIGS. 8–10, in which the various portions of tail 14 are in alignment and extend in a coplanar manner rearwardly from body 12, and tail 14 continues to move back and forth in this manner as long as fishing lure 10 is moved through the water.

It can be appreciated that tail 14 moves in a side-to-side manner with strong, high frequency movement, to provide action that is attractive to fish. In addition, it can be appreciated that movement of tail 14 also imparts side-to-side movement to body 12 by virtue of the connection of tail 14 to body 12 and the resilient nature of the material of body 12, to further enhance the attractiveness of lure 10 to fish during movement through the water.

While body 12 is shown and described as having a length that resembles that of a grub, it is also contemplated that body 12 may be formed so as to have a longer length to resemble a worm. In addition, while body 12 is shown and described as having ribs 16, it is also understood that body 12 may be smooth or may have any other surface pattern as desired.

In addition, while movement of fishing lure 10 is shown and described as being in a side-to side manner, it is also understood that movement of tail 14 of fishing lure 10 may be in an up-and-down manner.

Figure 17:
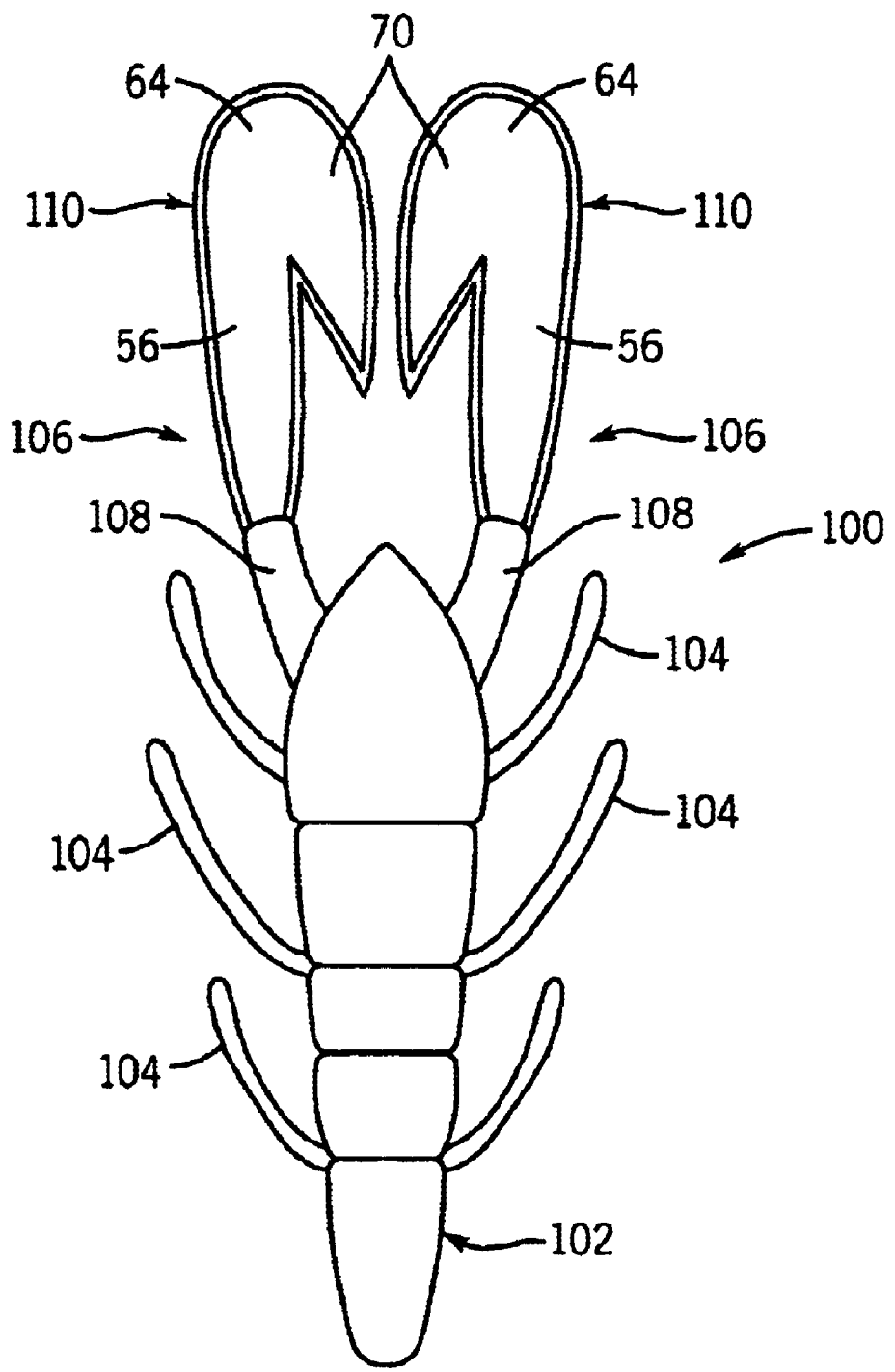
FIG. 17 is a view similar to FIG. 1, showing an alternative embodiment of a fishing lure incorporating a body extension member constructed according to the present invention.

FIG. 17 illustrates an alternative artificial fishing lure, shown at 100, incorporating a pair of body extension members in accordance with the present invention. In this embodiment, fishing lure 100 is in a form that generally resembles a crayfish, including a body 102 having a series of legs 104. A pair of body extension members, in the form of arms 106 that generally resemble claws, extend from the rearward end of body 102. Each arm 106 includes a connector section 108 that extends from body 102, and end structure 110 is connected to the outer end of connector section 108. End structure 110 is constructed identically to tail 14 of fishing lure 10, including first portion 56, second portion 64 and third portion 70. In this embodiment, end structure 110 functions to impart strong up-and-down or side-to-side movements to arms 106, which results in twisting of body 102 about its longitudinal axis. Legs 104 are resilient, such that the twisting of body 102 imparts a wavelike motion to legs 104. Such vigorous motion of body 102, legs 104 and arms 106 functions to attract fish as fishing lure 100 is pulled through the water.

While the body extension member of the present invention has been shown and described in connection with two specific lure configurations, it is understood that the body extension member may be used in connection with artificial fishing lures of virtually any configuration. In addition, it is understood that the end structure of the body extension member may be located at the end of any type of fishing lure body or any other member that extends from a fishing lure body.

Various alternatives and embodiments are contemplated as being within the scope of the following claims particularly pointing out and distinctly claiming the subject matter regarded as the invention.

I claim:

1. An artificial fishing lure, comprising:

a body defining a forward end and a rearward end; and a body extension member extending from the rearward end of the body, wherein the body extension member defines a forward end section interconnected with and extending from the rearward end of the body; a rearward end section defining a rearward end of the body extension member, and a laterally offset section located between the rearward end of the body and the rearward end of the body extension member, wherein the laterally offset section terminates in a forward end and defines an exposed, forwardly facing edge that extends inwardly from the forward end of the laterally offset section to a point of intersection defined between the forwardly facing edge and a facing edge defined by the body extension member rearwardly of the forward end section, wherein the body extension member is configured such that the forwardly facing edge of the laterally offset section catches the water as the artificial fishing lure is pulled through the water to impart a side-to-side motion for the body extension member.

2. The artificial fishing lure of claim 1, wherein the facing edge of the body extension member and the forwardly facing edge of the laterally offset section cooperate to generally define an acute angle.

3. The artificial fishing lure of claim 2, wherein the forwardly facing edge of the laterally offset section is generally linear.

4. The artificial fishing lure of claim 2, wherein the body extension member is configured to define a second edge extends forwardly from the rearward end of the body extension member, wherein the second edge is configured to cooperate with the forwardly facing edge of the laterally offset section to define a point of intersection therebetween.

5. The artificial fishing lure of claim 4, wherein at least a portion of the second edge of the body extension member is generally arcuate, wherein the body extension member comprises a first portion defined between the fit facing edge and the second edges of the body extension member, a generally flat second portion located rearwardly of the first portion and defining the rearward end of the body extension member, and a third portion defined between the second edge and the forwardly facing edge that extends generally forwardly relative to the second portion, wherein the third portion and an area of the second portion are configured to define the laterally offset section of the body extension member.

6. The artificial fishing lure of claim 5, wherein the body extension member has a thickness less than that of the body and includes a pair of generally flat, oppositely facing surfaces.

7. The artificial fishing lure of claim 5, wherein the body extension member comprises a tail section that extends from the rearward end of the body.

8. The artificial fishing lure of claim 5, wherein a pair of body extension members extend rearwardly from opposite sides defined by the rearward end of the body.

9. A fishing lure comprising:

a. a body; and b. a body extension member including a first portion that is interconnected with and extends away from the body, a second portion that is connected to the first portion, and a third portion that is connected to the second portion and that extends generally in a direction toward the body, wherein the third portion includes a substantially linear inner edge that faces the first portion of the body extension member, wherein the body extension member defines a pair of flat, outwardly facing surfaces that face in opposite directions, wherein the outwardly facing surfaces include beveled outer edges that intersect each other to form an outer rim of the body extension member.

10. A fishing lure comprising:

a. a body, and b. a body extension member including a first portion that is interconnected with and extends away from the body, a second portion that is connected to the first portion, and a third portion that is connected to the second portion and that extends generally toward the body, wherein the first portion and the third portion define facing edges that cooperate to define an acute angle, wherein the body extension member defines a pair of flat, outwardly facing surfaces that face in opposite directions, wherein the outwardly facing surfaces include beveled outer edges that intersect each other to form an outer rim of the body extension member.

11. A fishing lure comprising:

a. a body; and b. a body extension member including a first portion defining a forward end that is interconnected with the body, wherein the first portion extends rearwardly from the body, a second portion that is connected to the first portion, wherein the second portion defines a rearward end of the body extension member, and a third portion that is connected to the second portion and that extends generally in a forward direction from the second portion toward the body, wherein the third portion terminates in a forward end, and wherein the first portion and the third portion define facing edges that cooperate to form a pointed notch therebetween that defines an acute angle, wherein the pointed notch separates the first portion and the third portion.

12. The fishing lure of claim 11, wherein the facing edges defined by the first and third portions are substantially linear, and wherein the facing edge defined by the third portion extends from the pointed notch to the forward end defined by the third portion.

13. The fishing lure of claim 11, wherein the acute angle is an angle of between about 15 degrees and about 35 degrees.

14. The fishing lure of claim 13, wherein the acute angle is an angle of about 25 degrees.

15. The fishing lure of claim 11, wherein the body includes ribs that extend laterally along the body.

16. The fishing lure of claim 11, wherein the second portion of the body extension member has a curved outer edge that merges with an outer edge defined by the third portion of the body extension member and that defines the rearward end of the body extension member.

17. The fishing lure of claim 11, wherein a rear end of the body defines a decreasing thickness in an outward direction.

18. The fishing lure of claim 17, wherein the rear end of the body tapers inwardly and terminates in a C-shaped transition area between the body and the forward end defined by the first portion of the body extension member.

19. The fishing lure of claim 11, wherein the fishing lure includes a pair of body extension members that extend rearwardly from opposite sides defined by the body.

20. A fishing lure comprising:
 a. a body; and
 b. a body extension member including a first portion defining a forward end that is interconnected with the body, wherein the first portion extends rearwardly from the body, a second portion that is connected to the first portion, wherein the second portion defines a rearward end of the body extension member, and a third portion that is connected to the second portion and that extends generally in a forward direction from the second portion toward the body, wherein the third portion terminates in a forward end, and wherein the third portion includes a substantially linear inner edge that faces a substantially linear outer edge defined by the first portion of the body extension member, wherein the substantially linear inner edge defined by the third portion of the body extension member and the substantially linear outer edge defined by the first portion of the body extension member cooperate to form an acute angle defining a vertex therebetween.

21. The fishing lure of claim 1, wherein the and substantially linear inner edge defined by the third portion extends forwardly and laterally outwardly from the vertex to the forward end of the third portion.

22. The fishing lure of claim 21, wherein the acute angle is an angle of between about 15 degrees and about 35 degrees.

23. The fishing lure of claim 22, wherein the acute angle is an angle of about 25 degrees.

24. The fishing lure of claim 1, wherein the body includes ribs that extend laterally along the body.

25. The fishing lure of claim 1, wherein the second portion of the body extension member has a curved outer edge that merges with an outer edge defined by the third portion of the body extension member and that defines the rearward end of the body extension member.

26. The fishing lure of claim 1, wherein the body comprises an axially extending member and wherein the body extension member comprises a tail member that extends from a rearward end of the axially extending member, wherein the forward end defined by the first portion of the tail member has a first thickness and wherein the second portion of the tail member has a second thickness that is lesser than the first thickness.

27. The fishing lure of claim 26, wherein the forward end defined by the first portion of the tail member includes first and second outer surfaces, each of which tapers inwardly from a C-shaped transition area between the body and the forward end defined by the first portion of the tail member.

28. The fishing lure of claim 1, wherein the body is in a form resembling a crayfish, and wherein the body extension member comprises a pair of body extension members in the form of arm members that extend from the body at opposite sides defined by the body.

* * * * *

UNITED STATES PATENT AND TRADEMARK OFFICE
CERTIFICATE OF CORRECTION

PATENT NO.    : 6,843,017 B1
DATED         : January 18, 2005
INVENTOR(S)   : William E. Chambers Sr.

It is certified that error appears in the above-identified patent and that said Letters Patent is hereby corrected as shown below:

Column 6,
Line 2, after "edge" insert -- that --;
Line 10, after "between the" delete "fit";

Column 8,
Lines 10, 19, 21, 26 and 39, delete "1" and substitute therefore -- 20 --;
Line 10, before "substantially" delete "and".

Signed and Sealed this

Seventeenth Day of May, 2005

JON W. DUDAS
*Director of the United States Patent and Trademark Office*